United States Patent [19]

Barabas

[11] 3,958,101

[45] May 18, 1976

[54] SPACE HEATING USING OFF-PEAK ELECTRIC HEAT STORAGE

[75] Inventor: Miklos F. Barabas, Regina, Canada

[73] Assignee: Saskatchewan Power Corporation, Canada

[22] Filed: Mar. 7, 1974

[21] Appl. No.: 449,095

[30] Foreign Application Priority Data
Mar. 8, 1973   United Kingdom ............ 11313/73

[52] U.S. Cl. ................................ 219/365; 126/400; 165/103; 165/104 R; 219/364; 219/378; 252/70
[51] Int. Cl.² ...................... H05B 1/02; F24H 7/04
[58] Field of Search .......... 219/341, 365, 378, 530, 219/540, 325, 326, 302; 126/400, 273.5; 165/18, 104, 107, 106, 103; 252/70

[56] References Cited
UNITED STATES PATENTS

| | | | |
|---|---|---|---|
| 1,054,409 | 2/1913 | Harrison et al. | 219/378 UX |
| 2,022,812 | 12/1935 | Roe | 219/378 UX |
| 2,450,983 | 10/1948 | Osterheld | 219/364 X |
| 2,856,506 | 10/1958 | Telkes | 219/365 UX |
| 2,911,513 | 11/1959 | MacCracken | 219/378 X |
| 2,949,679 | 8/1960 | MacCracken et al. | 219/365 X |
| 3,141,454 | 7/1964 | Laing | 219/365 X |
| 3,464,486 | 9/1969 | Rice et al. | 219/378 X |
| 3,663,799 | 5/1972 | McArn | 219/335 UX |

FOREIGN PATENTS OR APPLICATIONS

| | | | |
|---|---|---|---|
| 657,973 | 2/1963 | Canada | 219/365 |
| 1,064,378 | 4/1967 | United Kingdom | 219/378 |
| 1,029,401 | 5/1966 | United Kingdom | 219/378 |
| 1,239,820 | 7/1971 | United Kingdom | 219/378 |

*Primary Examiner*—A. Bartis
*Attorney, Agent, or Firm*—Burns, Doane, Swecker & Mathis

[57] ABSTRACT

A method of heating and a heating system for buildings incorporating a heat storage material that is used to store heat electrically generated during off-peak electrical power periods and to deliver heat on demand. The heat storage material is a solid halogen salt such as $Na_2SO_4$, $NaCl$, $CaCl_2$, and $KCl$, and mixtures of these salts incorporating a silicate binding agent. The heat storage material remains in solid form without suffering appreciable physical deterioration while being operated throughout a temperature range of room temperature to about 1200°F. Generation of heat during the off-peak electrical power periods is automatically controlled.

15 Claims, 7 Drawing Figures

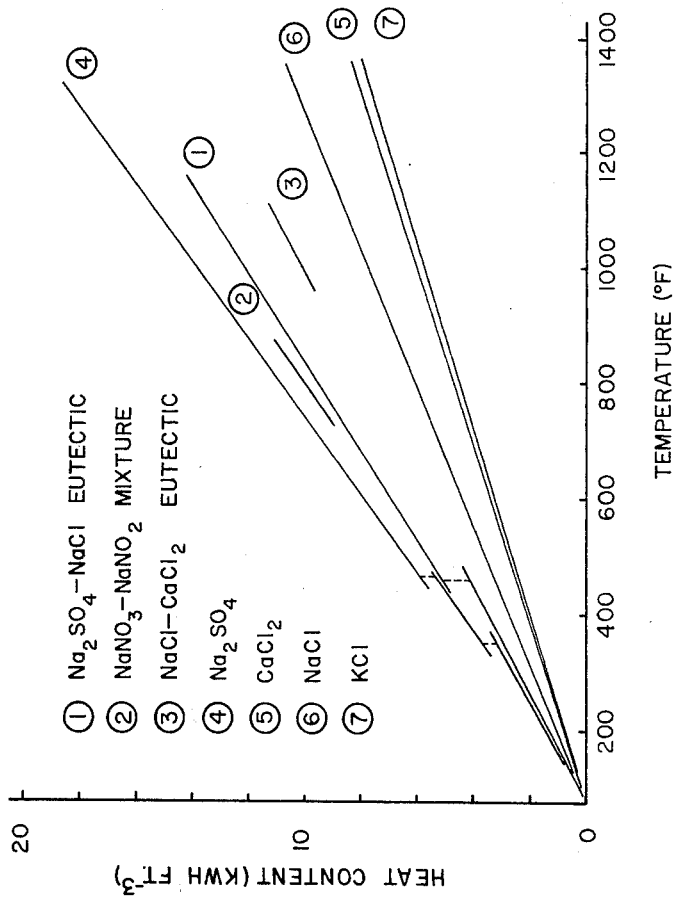

ENLARGED SECTION A-A

SPACE HEATING USING OFF-PEAK ELECTRIC HEAT STORAGE

This invention relates to an off-peak electrical heating system, and more particularly to a heating system which utilizes heat that is generated and stored in a heat storage medium during the off-peak hours of electricity demand.

This heating system can be used to heat a conventional home in the same manner as a conventional natural gas or oil furnace, or electrical heating system.

SUMMARY OF THE INVENTION

The basic principle of the off-peak electrical heating system is the storage during off-peak electrical power periods of heat in a suitable heat storage material. The stored heat is then withdrawn from the storage material on a "heat-on-demand" basis, thus relieving the electrical power system of the heating load. Operation in this manner leads to more effective utilization of the generation, transmission and distribution facilities of the electrical power system.

Suitable materials for heat storage are inexpensive halogen salts such as sodium sulphate ($Na_2SO_4$), sodium chloride (NaCl), potassium choloride (KCl), sodium chloride ($CaCl_2$), or mixtures of these salts. These salts, or salt mixtures, are cast or molded into blocks. Binding agents such as silicates may be used.

Electrical heating elements, which are used in generating and transmitting heat to the salt, or salt mixture blocks, are embedded in the blocks while the blocks are being cast or molded, or are wrapped around the circumference of the blocks.

The surfaces of the blocks may be sealed to prevent the transmission of obnoxious odors into and out of the blocks. The electrical heating elements may be coated with a corrosion protective material to prevent corrosion of the heating element by the salt or salt mixture.

The heating system may be of a closed loop type wherein cold air to be heated is passed through a heat exchanger wherein the cold air is heated by an exchange of heat from a closed separate system of air that is heated by the heat stored in the blocks. The heating system may also be of an open loop type wherein the cold air to be heated is separated into two portions and one portion is heated by the heat stored in the blocks before it is joined with the other portion. An air flow control regulates the relative proportions of air thereby providing control over the temperature of the mixed heated air.

Transmission of electrical power to the blocks is controlled by an uninterruptible electronic timer and clock. The maximum amount of heat that can be stored in the blocks is controlled by a variable capacity control. A timer by-pass control permits a partial supply of electrical power to be drawn for heating when insufficient heat is stored in the blocks.

IN THE DRAWINGS

FIG. 1 is a graph showing heat content per unit volume as a function of temperature for various heat storage materials;

FIG. 2b is a side view of the element shown in FIG. 2a;

FIG. 2c is a sectional view taken along section A—A of FIG. 2a;

DETAILED DESCRIPTION OF THE INVENTION

Selection of a suitable heat storage material is an important feature of this invention. Suitable heat storage materials will have the ability to store (1) a maximum amount of heat within (2) a minimum volume over (3) a minimum temperature rise.

Countries like Canada, which experience very low climatic temperatures in the winter, for efficiency reasons cannot rely on heat storage materials which necessitate large and bulky storage units for sufficient capacity, or very high temperatures. Furthermore, the heat storage material must meet such practical requirements as low cost, ready availability and ease of handling.

Among the materials which meet these requirements, but which, as far as is known, have not been applied to systems that can heat an entire house, are a variety of salts, and mixtures of these salts. The density and thermal conductivity of these salts in their natural form is low, but is considerably improved if the salts are in the form of solid blocks. Solid blocks are most readily obtained by casting the molten salt or salt mixture.

Depending on the particular application, artificial binding agents can serve to strengthen the block structure. Silicates may be used as binding agents.

A graphic plotting of heat content per unit volume as a function of temperature for various salts provides a useful means of evaluating potential heat storage materials (See FIG. 1). The slope of the line indicates heat content per unit volume per degree of temperature. Materials having maximum heat capacity per unit of volume per unit of temperature can therefore readily be identified.

Maximum usable temperature of the heat storage material must also be considered from the standpoint of casting temperatures and maximum system design temperature. Each salt has a certain melting point, and eutectic mixtures of salts have lower melting points than the pure salts.

Salts, and mixtures of salts, which have very high melting points are not generally satisfactory because of the difficulty in casting or molding blocks from such salts and salt mixtures. On the other hand, salts, and mixtures of salts, which have low melting points are not generally satisfactory because they might melt during peak operating temperatures of the heating system.

For purposes of constructing a heat storage element 1, the salt, or salt mixture, is formed in blocks with an electrical heating element 2 embedded in the block. A typical heat storage element 1 consists of a salt casting which surrounds the electrical heating element. Depending on the corrosiveness of the salt and its electrical and thermal conductivity properties, the electrical heating element 2 may be coated with a protective material 3 prior to casting.

Figure 2A:
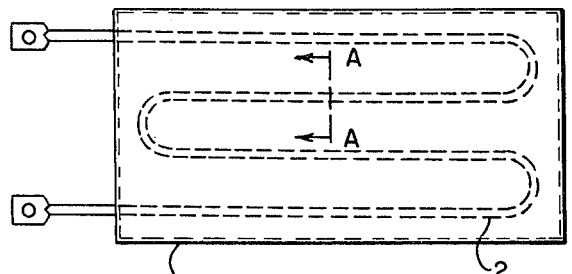
FIG. 2a is an elevation view of a typical heat storage element.
Figure 2B:
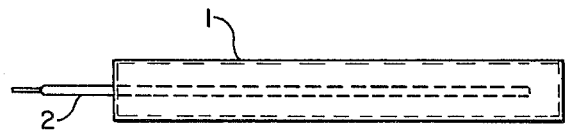
Figure 2C:
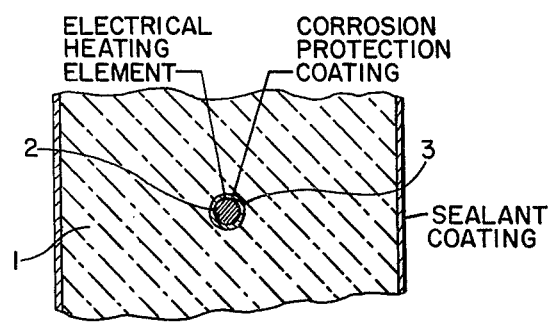
Figure 3A:
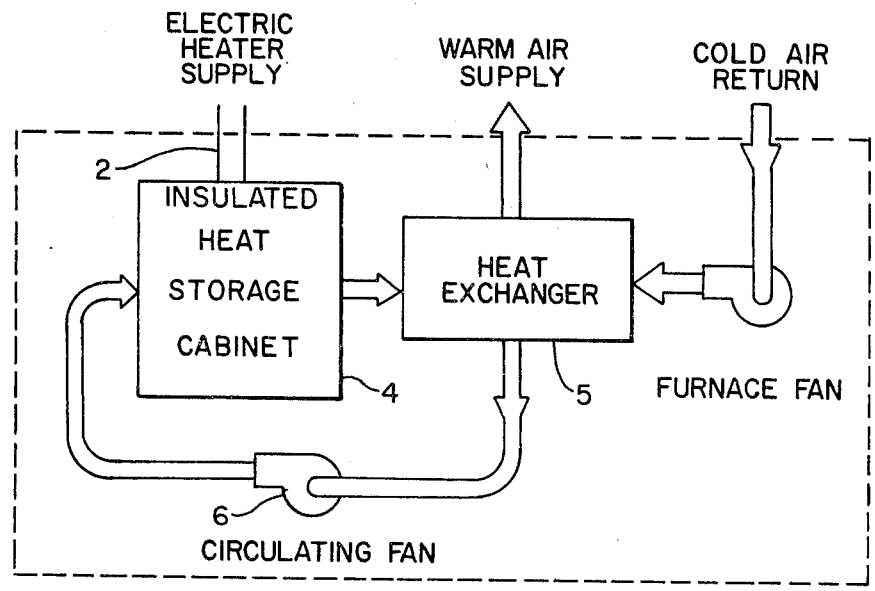
FIG. 3a is a diagrammetric representation of a closed loop heating system.
Figure 3B:
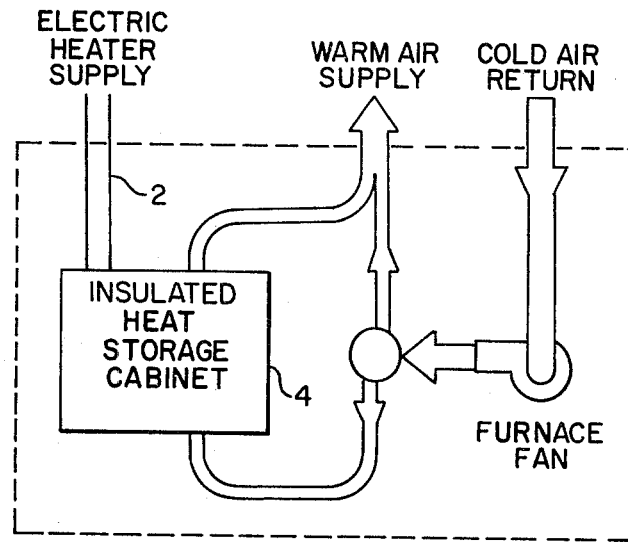
FIG. 3b is a diagrammetric representation of an open loop heating system.

The heat storage elements are grouped together and insulated to provide a heat storage cabinet 4, the number of heat storage elements depending on the heat storage capacity that is required. This heat storage cabinet 4 is a part of the space heating system which may be of a closed loop (See FIG. 3a) or an open loop type (See FIG. 3b).

In the closed loop system, heated air is supplied from a heat storage cabinet 4 to a heat exchanger 5 by means of air flow induced by a circulating fan 6. The heat exchanger 5 transmits some of the heat from the air from the heat storage cabinet 4 to the cold air that is taken from the space to be heated. The air is circulated as in a conventional hot air heating system.

In the open loop system a controlled portion of the return air from the space being heated passes through the heat storage cabinet 4 and is then mixed with the remaining portion of the air to provide warm air to the space being heated at the required temperature.

One reason for choosing between the open loop and closed loop systems is whether the heat storage material tends to trap and subsequently release odours. Certain materials will trap odours as they cool and then release them during a warm-up period. Such materials would require a closed loop unit design to avoid odours being circulated throughout the space being heated, such as a house. Alternatively, the surface of the heat storage elements 1 can be sealed by encapsulation or a coating, if this results in a cheaper arrangement with equally satisfactory operation.

Figure 4:
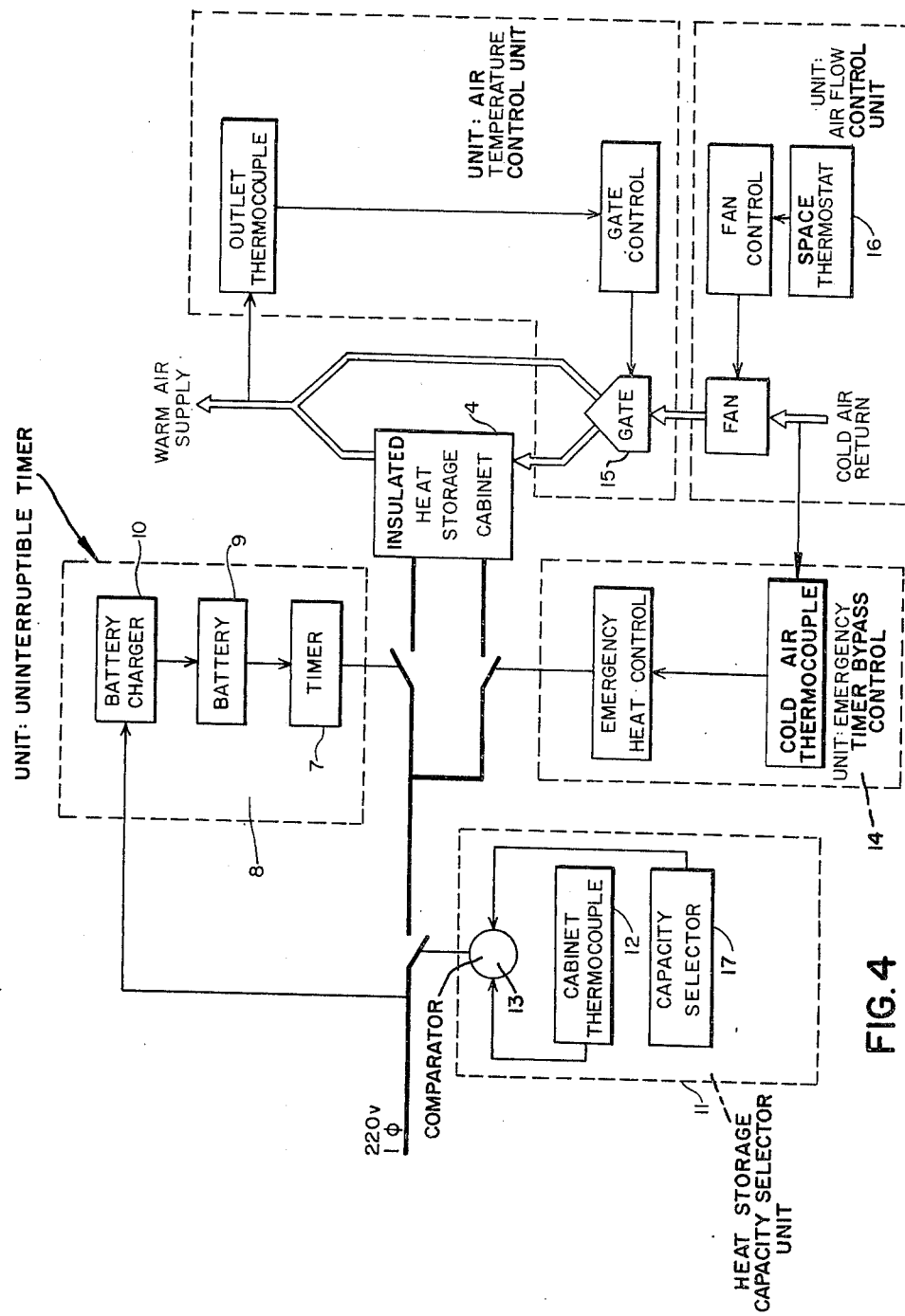
FIG. 4 is a diagrammetric representation of the heating system including control circuitry.

The electrical heating elements 2 in the blocks of the heat storage cabinet 4 should have sufficient capacity to provide for both home heating and stored heat during the off-peak hours of electric power supply, the stored heat capacity being determined by cycle of operation. For example, if 180 KWhr is the estimated maximum heat requirement for a 24 hour period and electricity is to be drawn for only 8 hours during the night, the heating elements 2 must have 180/8 = 22½ KW capacity. 7½ KW are required during the 8 hour period for home heating, representing 60 KWhr, the remaining 15 KW are required for heating the blocks to store 120 KWhr of heat for the 16 hour period when electricity is not being drawn. Electrical power in North America is usually supplied in 220V single phase and is generally available for residences. The service for residences that are adapted to use this off-peak heat storage system is similar to that for an existing electrically heated home, except for the control unit (See FIG. 4) which limits power supply for the heating system to designated off-peak hours.

This control unit, and others which are not found on conventional furnaces, are described in more detail below.

DESCRIPTION OF CONTROL CIRCUITRY FOR OFF-PEAK ELECTRIC HEAT STORAGE SYSTEM

Uninterruptible Timer and Uninterruptible Timer (See: Unit:Clock)

The uninterruptible timer 8 includes a timer 7 and serves the function of providing a control signal to supply power to the blocks for a predetermined interval every 24 hours. In order to provide the uninterruptible feature, in case of power failure the timer 8 is powered by a battery 9. The battery 9 is continuously trickle-charged 10 when power is available. The uninterruptible timer 8 circuitry employ CMOS integrated circuits to reduce power drain to the point where small, inexpensive, rechargeable batteries can be used.

Digital logic switching is employed to automatically switch from the usual 60 cps power frequency to an onboard cps oscillator/frequency divider. This feature eliminates the need for an electromechanical relay.

The implementation of a variable timer period either 8, 9, or 10 hours) is accomplished by decoding the seven-segment output pulses from the "minutes" digit on a digital alarm clock integrated circuit. One pulse every ten minutes is obtained and is then divided and counted to obtain the correct timer period.

This uninterruptible time 8 scheme provides higher accuracy than is possible with a resistor-capacitor discharge timer and, more importantly for this application, a much lower power drain than is possible with electromechanical timers.

Variable Capacity Control (See: Unit:Heat Storage Capacity Selector)

This control 11 serves to set the maximum energy to be stored in the insulated heat storage cabinet 4 at the choice of the user. This feature is implemented by varying the maximum temperature at which power to the cabinet 4 is switched off.

The temperature is sensed by a thermocouple 12. An integrated circuit comparator 13 (shown as Capacity Selector in FIG. 4) compares the thermocouple output voltage supplied by the capacity selector 17 to a reference voltage. Once the thermocouple voltage reaches the reference voltage, a comparator output signal actuates circuitry to switch off the power to the cabinet 4. The reference voltage is adjusted by means of a multi-position switch connected to a resistive voltage divider.

This scheme has the advantage of high accuracy, the accuracy being limited only by the accuracy of the thermocouple.

Timer Bypass Control Timer Bypass Control (See: Unit:Emergency)

This control 14 acts to limit the minimum temperature which the space to be heated, such as a house, may reach as a result of a power failure during the charging cycle, or other cause of insufficient heat. At a preset temperature, a fraction of the heating system capacity is energized independently of the setting of the uninterruptible timer 8.

Emergency heat supply may be activated by a thermal switch or a thermocouple output compared to a preset voltage. Either of these means results in a limited supply of electric heating to the heated space provided that the capacity selector unit is in a heating position (as opposed to "off" or "fan"). The supply is limited since a power failure might affect a sizable region and the electrical distribution system would not cope with full electric heating plus peak daytime loads. The electrical power supply is sufficient only to insure that freezing temperatures will not occur in the heated space under such conditions.

Air Flow Control (See: Unit:Air Flow Control Unit and Unit:Temperature Air Temperature Control Unit)

Two methods can be used to regulate the amount of proportion of air which flows through or past the heat storage cabinet 4.

One method is to regulate the degree of opening of gate 15 on the inlet of the heat storage cabinet.

The second method is to use an air deflector which regulates the proportion of air which flows through the heat storage cabinet 4 and the air which by-passes the heat storage cabinet. In the second method, gates fitted on the inlet and outlet of the heat storage cabinet 4 will be either completely open or completely closed, (depending on the state of thermostat 16 located in the heated space). A deflector mechanism replaces gate 15 shown in FIG. 4. Thermostat 16 operates a fan control which controls the fan blowing air through the system.

It will be appreciated that the foregoing description is directed to a preferred embodiment of the invention and that various technical non-inventive modifications and variations can be made to the invention to adapt the invention to various uses. It is to be understood, therefore, that such modifications and variations fall within the spirit and scope of the invention and the following claims to the invention.

I claim:

1. A method of heating which comprises:
   storing heat generated by means of electricity in a solid mass of material selected from the group consisting of $Na_2SO_4$, NaCL, $CaCL_2$ and KC1, and mixtures of these materials, the material incorporating a binding agent operable to bind together the material constituting the solid mass throughout a contemplated range of operating temperatures of the solid mass;
   storing the heat in the heat storage material during off-peak electrical power periods and withdrawing the heat from the heat storage material on demand; and
   operating the heat storage material in a solid form without appreciable physical deterioration throughout a temperature range of about room temperature to about 1200°F.

2. The method of claim 1 wherein the solid mass of heat storage material is in the form of solid blocks.

3. The method of claim 2 wherein an electrical heating element is used in generating and transmitting heat to the heat storage material and the electrical heating element is partially embedded in the heat storage material.

4. The method of claim 3 wherein the external surface of the electrical heating element is coated with a corrosion protective material.

5. The method of claim 2 wherein the solid blocks are grouped together and insulated to provide a heat storage cabinet.

6. The method of claim 2 wherein the surfaces of the solid blocks are sealed by encapsulation.

7. The method of claim 2 wherein the surfaces of the solid blocks are sealed by a suitable coating.

8. The method of claim 1 wherein the electricity generating the heat is drawn for a period of 8 to 10 hours during the night.

9. The method of claim 1 wherein warm air for heating is provided by splitting a cold air supply into two flows, bringing one air flow into contact with the heat storage material, and re-mixing the two flows, the temperature of the mixed flow being set by controlling the relative ratio of air in the two flows.

10. The method of claim 1 wherein the binding agent is a silicate binding agent.

11. A heating system which comprises
    a solid mass of heat storage material for storing heat generated electrically during off-peak electrical power periods and to deliver heat on demand;
    means associated with the heat storage material for electrically generating heat for storage in the heat storage material during off-peak electrical power periods, said means being operable to raise the temperature of the material to about 1200°F;
    means associated with the heat storage material for withdrawing heat stored in the heat storage material;
    the heat storage material being selected from the group consisting of $Na_2SO_4$, NaCL, $CaCL_2$ and KCl, and mixtures of these materials;
    the heat storage material incorporating a binding agent operable to bind together the material constituting the solid mass throughout a contemplated range of operating temperatures of the solid mass; and
    the heat storage material being capable of operating as a solid without appreciable physical deterioration throughout a temperature range of about room temperature to about 1200°F.

12. The heating system of claim 11 wherein an electrical heating element is used in generating and transmitting heat to the heat storage material and the electrical heating element is partially embedded in the heat storage material.

13. The heating system of claim 11 wherein means separates cold air to be heated into two portions, a second means then passes one portion into contact with the storage mass for heating, a third means passes the second portion by the storage mass, without contacting the storage mass for heating, and a fourth means then mixes the heated and bypassed portions into one portion.

14. The heating system of claim 13 wherein the ratio of air that is separated into the two portions is controlled by an air flow control associated with the means for separating the air flow into two portions.

15. The heating system of claim 11 wherein said binding agent is a silicate binding agent.

* * * * *